US012728626B2

(12) United States Patent
Wu et al.

(10) Patent No.: US 12,728,626 B2
(45) Date of Patent: Sep. 8, 2026

(54) METALIZING MATERIALS

(71) Applicant: Nanhai Nanxin Non-Woven Co. Ltd., Foshan City (CN)

(72) Inventors: Dong Wu, Suzhou (CN); Yongji Jin, Suzhou (CN); Minglan Fang, Suzhou (CN)

(73) Assignee: Nanhai Nanxin Non-Woven Co. Ltd., Foshan City (CN)

( * ) Notice: Subject to any disclaimer, the term of this patent is extended or adjusted under 35 U.S.C. 154(b) by 229 days.

(21) Appl. No.: 18/692,486

(22) PCT Filed: Sep. 17, 2021

(86) PCT No.: PCT/CN2021/119075
§ 371 (c)(1),
(2) Date: Mar. 15, 2024

(87) PCT Pub. No.: WO2023/039834
PCT Pub. Date: Mar. 23, 2023

(65) Prior Publication Data

US 2024/0383230 A1 Nov. 21, 2024

(51) Int. Cl.
*B32B 15/14* (2006.01)
*B32B 7/12* (2006.01)
(Continued)

(52) U.S. Cl.
CPC ................ *B32B 15/14* (2013.01); *B32B 7/12* (2013.01); *B32B 27/12* (2013.01); *B32B 37/20* (2013.01);
(Continued)

(58) Field of Classification Search
None
See application file for complete search history.

(56) References Cited

U.S. PATENT DOCUMENTS

2005/0196604 A1 9/2005 Funicelli et al.
2007/0037465 A1* 2/2007 Nutz ........................ C23C 28/00 442/376

(Continued)

FOREIGN PATENT DOCUMENTS

CN 202439296 U 9/2012
EP 0038878 A1 * 11/1981 ............... B32B 7/06

(Continued)

OTHER PUBLICATIONS

Protolabs—Acrylic vs Polycarbonate—transparent plastics—Jan. 17, 2026 (Year: 2026).*

(Continued)

*Primary Examiner* — John Vincent Lawler
(74) *Attorney, Agent, or Firm* — BURR & FORMAN

(57) ABSTRACT

Metalized materials are provided, in which the metalized materials include (i) a substrate comprising a nonwoven, a film, or a combination thereof; (ii) a metal coating layer (MCL); and (iii) a transparent coating layer (TCL); wherein the MCL is located directly or indirectly between the substrate and the TCL. Peelable metalized materials are also provided, in which the peelable metalized materials include a metalized material and a removable carrier layer located directly adjacent to the TCL. Methods for making peelable metalized materials and metalized materials are also provided.

14 Claims, 9 Drawing Sheets

(51) Int. Cl.
*B32B 27/12* (2006.01)
*B32B 37/20* (2006.01)

(52) U.S. Cl.
CPC ....... *B32B 2250/03* (2013.01); *B32B 2255/06* (2013.01); *B32B 2255/26* (2013.01); *B32B 2307/718* (2013.01); *B32B 2307/7246* (2013.01); *B32B 2307/748* (2013.01)

(56) References Cited

U.S. PATENT DOCUMENTS

| | | | | |
|---|---|---|---|---|
| 2010/0247855 | A1* | 9/2010 | Bletsos | C23C 14/20 428/209 |
| 2020/0216948 | A1 | 7/2020 | Conolly et al. | |
| 2020/0353720 | A1 | 11/2020 | Cui et al. | |
| 2021/0214886 | A1 | 7/2021 | Hussey et al. | |

FOREIGN PATENT DOCUMENTS

| | | | | |
|---|---|---|---|---|
| GB | 1504814 A | | 3/1978 | |
| JP | S62122746 A | * | 6/1987 | B32B 15/08 |
| JP | 2009504446 A | | 2/2009 | |
| JP | 2009255294 A | | 11/2009 | |
| WO | 2007098016 A1 | | 8/2007 | |

OTHER PUBLICATIONS

Nishiura—JP S62-122746 A—Jap D2—MT—metallic-fiber sheet laminate—1987 (Year: 1987).*
Notification of the First Office Action in the corresponding Chinese Application No. 202180102376.1, mailed Oct. 29, 2025, all pages cited in its entirety.
Notice of reasons for refusal from corresponding JP Application No. 2024-517038, mailed Apr. 22, 2025, all pages cited in its entirety.
Decision of Refusal from corresponding Japanese Application No. 2024-517038, mailed Jan. 13, 2026, all pages cited in its entirety.
Request for Submission of an Opinion from corresponding Korean Application No. 10-2024-7012482, mailed Jan. 29, 2026, all pages cited in its entirety.
Extended Search Report and Written Opinion from corresponding European Application No. 21957118, mailed Jun. 26, 2025, all pages cited in its entirety.
International Search Report and Written Opinion of International Application No. PCT/CN2021/119075 mailed on Jun. 6, 2022, all enclosed pages cited.
International Preliminary Report on Patentability of International Application No. PCT/CN2021/119075 mailed on Jan. 9, 2024, all enclosed pages cited.
Second Office Action from corresponding Chinese Application No. 202180102376.1, mailed Apr. 11, 2026, all pages cited in its entirety.

* cited by examiner

METALIZING MATERIALS

TECHNICAL FIELD

Embodiments of the presently-disclosed invention relate generally metalized materials (e.g., sheets, blankets, etc.) including (i) a substrate comprising a nonwoven, a film, or a combination thereof, (ii) a metal coating layer (MCL), and (iii) a transparent coating layer (TCL), in which the MCL is located directly or indirectly between the substrate and the TCL. Embodiments of the presently-disclosed invention also relate to peelable metalized materials, in which the peelable metalized materials include a metalized material and a removable carrier layer located directly adjacent to the TCL.

BACKGROUND

Metalized materials, such as metalized blankets, traditionally include a metal coating applied to a base substrate, such as a nonwoven or a film. Such metalized materials, for example, provide a mechanism to by which a user's body heat is significantly retained. In this regard, the metalized materials (e.g., also known as a space blanket, mylar blanket, first aid blanket, safety blanket, thermal blanket, etc.) include a heat-reflective metal coating applied to a thin plastic film or nonwoven. Ideally, the metalized materials reflect around 90% of a user's body heat to mitigate heat loss from the user's body.

Some such metalized materials have been produced, for example, by directly coating a metal layer (e.g., a metal coating) onto a plastic film or a plastic nonwoven web by a vacuum coating process, a chemical coating process, or an electrostatic coating process. Due to the conductive nature of the metal coating on the plastic film and/or nonwoven, a significant electrical hazard may be present when such metalized materials are used with diathermy and metal operating tables.

An additional drawback of some metalized materials relates their lack of breathability and/or flexibility. In this regard, applications of such metalized blankets for the retention of body heat may also desire a desirable level of vapor permeability and/or flexibility (e.g., to easily conform to a user's body).

Still further, traditional methods of directly coating the metal layer onto the nonwoven or film may not provide enough specular reflection with a reduced amount of metal deposited on the nonwoven or film. That is, direct coating of the metal layer onto the supporting substrate (e.g., film or nonwoven) often times requires a greater amount of metal to be deposited thereon to achieve the desired level of reflectance, which may negatively impact breathability and/or flexibility as noted above.

Alternative methods of producing such metalized materials include steps of laminating a thin metal foil sheet onto the supporting substrate (e.g., a plastic film or plastic nonwoven) with an adhesive. Such an approach, however, can be particularly difficult and unreliable. If the metal foil sheet is too thin, for example, it may be easily broken during the lamination process.

SUMMARY OF INVENTION

One or more embodiments of the invention may address one or more of the aforementioned problems. Certain embodiments according to the invention provide a metalized material including the following: (i) a substrate comprising a nonwoven, a film, or a combination thereof; (ii) a metal coating layer (MCL); and (iii) a transparent coating layer (TCL); wherein the MCL is located directly or indirectly between the substrate and the TCL.

In another aspect, the present invention provides a peelable metalized material, in which the peelable metalized material comprises a metalized material as described and disclosed herein, and a removable carrier layer located directly adjacent to the TCL. For instance, the carrier layer may be selectively removed or peeled away leaving behind the TCL.

In another aspect, the present invention provides a method of producing a peelable metalized material comprising the following: (i) providing or forming a metal-containing intermediate material comprising (a) a carrier layer, (b) a transparent coating layer (TCL) located directly adjacent the carrier layer; (c) a metal coating layer (MCL) located directly adjacent the TCL, and (d) optionally a protective coating directly or indirectly adjacent the MCL, wherein the MCL is located between the protective coating and the TCL; (ii) providing or forming a substrate comprising at least one nonwoven, at least one film, or a combination thereof; and (iii) bonding the metal-containing intermediate material to the substrate to provide the peelable metalized material, such as disclosed and described herein.

In still yet another aspect, the present invention provides a method of producing a metalized material comprising the following: (i) providing a peelable metalized material, such as those described and disclosed herein, or forming a peelable metalized material by a method such as those described and disclosed herein; and (ii) removing the carrier layer to provide a metalized material, such as described and disclosed herein.

BRIEF DESCRIPTION OF THE DRAWING(S)

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

DETAILED DESCRIPTION

Figure 1A:
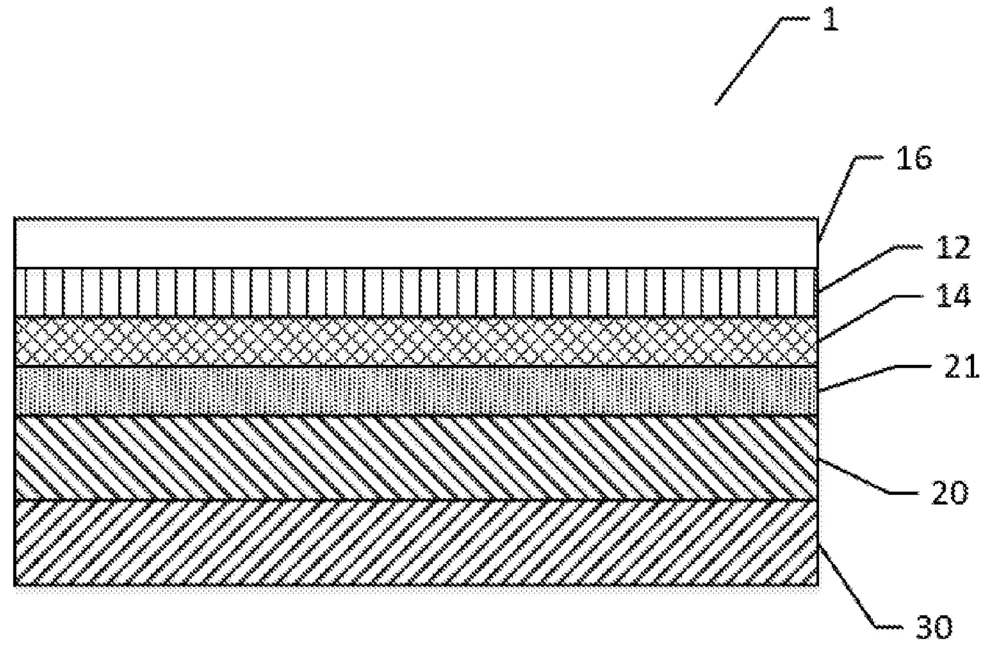
FIG. 1A illustrates a metalized material in which a film layer is melt extruded directly onto a nonwoven layer, in accordance with certain embodiments of the invention.

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

Certain embodiments of the invention generally relate to metalized materials (e.g., electrically non-conductive metalized materials) that include a substrate, which may include one or more nonwoven layers and/or one more plastic film layers, a metal coating layer (MCL), and a transparent coating layer (TCL), in which the MCL is located directly or indirectly between the TCL and the substrate. For example, the TCL may define a first outermost layer of the metalized material and a film layer may define a second outermost layer of the metalized material, in which the MCL constitutes at least one layer between the two outermost layers of the metalized materials. For example, the metalized material may comprise a product composite including a MCL encased directly or indirectly between the TCL and the substrate or other optional intermediate layers and described herein. In this regard, the MCL is not directly exposed to an external environment. As such, the MCL is shielded from external environments and severely mitigates or eliminates any electrical conductivity that may otherwise be associated with a MCL. The metalized material, for instance, may be a non-conductive metalized material as the MCL will not be in contact with the external environment. For example, the MCL is not an electrical hazard, for example, in an operating room environment.

In accordance with certain embodiments of the invention, the substrate, which may be one or more nonwoven layers, one or more film layers, or a combination thereof (e.g., a composite include both at least one nonwoven layer and at least one film layer), may comprise a desirable level of flexibility (e.g., as measured by Handle-O-Meter) to provide sufficient drapeability and/or wrapability (e.g., wrapped around a user) and/or desirable breathability (e.g., allow vapors to travel through the substrate and out the other side of the metalized material) and/or desirable level of liquid penetration resistance as measured by hydrostatic head.

The MCL, in accordance with certain embodiments of the invention, comprise a high reflectance metal or high reflectance metal alloy, such as aluminum (or alloy thereof), gold (or alloy thereof), copper (or alloy thereof), and silver (or alloy thereof). Optionally, the metalized material may also include a protective coating. The protective coating may be provided as a separate layer, in which the MCL is directly or indirectly sandwiched between the TCL and the protective coating.

The TCL, as discussed below, may be generally transparent in electromagnetic radiation associated with a mammal, such as a human, such that the radiation or heat emitted by a user passes through the TCL and is reflected back to the user by the MCL. In use, that is, the TCL will typically be positioned proximate a user, while the substrate will be positioned distal from the user. The MCL, for instance, may be deposited directly onto the TCL, which may function as a release coating applied to a carrier layer or a release liner. A bond strength between the TCL and the carrier layer may be less than a bond strength between the MCL and the optional protective coating or the substrate. Accordingly, the carrier layer may be removed (e.g., peeled away) to leave the TCL bonded to the MCL such that the TCL defines one of the outermost layers of the metalized material.

In accordance with certain embodiments of the invention, the metalized material may be used as a reflective and warming layer to reduce heat loss from human body. In this regard, the metalized material may be provided in the form of gowns, facemasks, sterilization wraps, head coverings, heating pads, surgical drape, medical warming blanket and outing warming blanket applications with high reflectivity, non-conductivity, good flexibility, enough pliability and breathability. For example, during cold weather in the wild, wrapping a metalized material around a user's body can help prevent loss of emitted heat and reduce body heat loss.

The terms "substantial" or "substantially" may encompass the whole amount as specified, according to certain embodiments of the invention, or largely but not the whole amount specified (e.g., 95%, 96%, 97%, 98%, or 99% of the whole amount specified) according to other embodiments of the invention.

The terms "polymer" or "polymeric", as used interchangeably herein, may comprise homopolymers, copolymers, such as, for example, block, graft, random, and alternating copolymers, terpolymers, etc., and blends and modifications thereof. Furthermore, unless otherwise specifically limited, the term "polymer" or "polymeric" shall include all possible structural isomers; stereoisomers including, without limitation, geometric isomers, optical isomers or enantionmers; and/or any chiral molecular configuration of such polymer or polymeric material. These configurations include, but are not limited to, isotactic, syndiotactic, and atactic configurations of such polymer or polymeric material. The term "polymer" or "polymeric" shall also include polymers made from various catalyst systems including, without limitation, the Ziegler-Natta catalyst system and the metallocene/single-site catalyst system. The term "polymer" or "polymeric" shall also include, in according to certain embodiments of the invention, polymers produced by fermentation process or biosourced.

The terms "nonwoven" and "nonwoven web", as used herein, may comprise a web having a structure of individual fibers, filaments, and/or threads that are interlaid but not in an identifiable repeating manner as in a knitted or woven fabric. Nonwoven fabrics or webs, according to certain embodiments of the invention, may be formed by any process conventionally known in the art such as, for example, meltblowing processes, spunbonding processes, needle-punching, hydroentangling, air-laid, and bonded carded web processes. A "nonwoven web", as used herein, may comprise a plurality of individual fibers that have not been subjected to a consolidating process.

The terms "fabric" and "nonwoven fabric", as used herein, may comprise a web of fibers in which a plurality of the fibers are mechanically entangled or interconnected, fused together, and/or chemically bonded together. For example, a nonwoven web of individually laid fibers may be subjected to a bonding or consolidation process to bond at least a portion of the individually fibers together to form a coherent (e.g., united) web of interconnected fibers.

The term "consolidated" and "consolidation", as used herein, may comprise the bringing together of at least a portion of the fibers of a nonwoven web into closer proximity or attachment there-between (e.g., thermally fused together, chemically bonded together, and/or mechanically entangled together) to form a bonding site, or bonding sites, which function to increase the resistance to external forces (e.g., abrasion and tensile forces), as compared to the unconsolidated web. The bonding site or bonding sites, for example, may comprise a discrete or localized region of the web material that has been softened or melted and optionally subsequently or simultaneously compressed to form a discrete or localized deformation in the web material. Furthermore, the term "consolidated" may comprise an entire nonwoven web that has been processed such that at least a portion of the fibers are brought into closer proximity or attachment there-between (e.g., thermally fused together, chemically bonded together, and/or mechanically entangled together), such as by thermal bonding or mechanical entanglement (e.g., hydroentanglement) as merely a few examples. Such a web may be considered a "consolidated nonwoven", "nonwoven fabric" or simply as a "fabric" according to certain embodiments of the invention.

The term "staple fiber", as used herein, may comprise a cut fiber from a filament. In accordance with certain embodiments, any type of filament material may be used to form staple fibers. For example, staple fibers may be formed from polymeric fibers, and/or elastomeric fibers. Non-limiting examples of materials may comprise polyolefins (e.g., a polypropylene or polypropylene-containing copolymer), polyethylene terephthalate, and polyamides. The average length of staple fibers may comprise, by way of example only, from about 2 centimeter to about 15 centimeter.

The term "spunbond", as used herein, may comprise fibers which are formed by extruding molten thermoplastic material as filaments from a plurality of fine, usually circular, capillaries of a spinneret with the diameter of the extruded filaments then being rapidly reduced. According to an embodiment of the invention, spunbond fibers are generally not tacky when they are deposited onto a collecting surface and may be generally continuous as disclosed and described herein. It is noted that the spunbond used in certain composites of the invention may include a nonwoven described in the literature as SPINLACE®. Spunbond fibers, for example, may comprises continuous fibers.

As used herein, the term "continuous fibers" refers to fibers which are not cut from their original length prior to being formed into a nonwoven web or nonwoven fabric. Continuous fibers may have average lengths ranging from greater than about 15 centimeters to more than one meter, and up to the length of the web or fabric being formed. For example, a continuous fiber, as used herein, may comprise a fiber in which the length of the fiber is at least 1,000 times larger than the average diameter of the fiber, such as the length of the fiber being at least about 5,000, 10,000, 50,000, or 100,000 times larger than the average diameter of the fiber.

The term "meltblown", as used herein, may comprise fibers formed by extruding a molten thermoplastic material through a plurality of fine die capillaries as molten threads or filaments into converging high velocity, usually hot, gas (e.g. air) streams which attenuate the filaments of molten thermoplastic material to reduce their diameter, which may be to microfiber diameter, according to certain embodiments of the invention. According to an embodiment of the invention, the die capillaries may be circular. Thereafter, the meltblown fibers are carried by the high velocity gas stream and are deposited on a collecting surface to form a web of randomly disbursed meltblown fibers. Meltblown fibers may comprise microfibers which may be continuous or discontinuous and are generally tacky when deposited onto a collecting surface. Meltblown fibers, however, are shorter in length than those of spunbond fibers.

As used herein, the term "monolithic" film may comprise any film that is continuous and substantially free or free of pores (e.g., devoid of pores). In certain alternative embodiments of the invention, a "monolithic" film may comprise fewer pore structures than would otherwise be found in a microporous film. According to certain non-limiting example embodiments of the invention, a monolithic film may act as a barrier to liquids and particulate matter but allow water vapor to pass through. In addition, without intending to be bound by theory, by achieving and maintaining high breathability, it is possible to provide an article that is more comfortable to wear because the migration of water vapor through the laminate helps reduce and/or limit discomfort resulting from excess moisture trapped against the skin. A "monolithic" film, for example, may comprise a highly breathable polymer.

The term "highly breathable polymer", as used herein, may comprise any polymer or elastomer that is selectively permeable to water vapor but substantially impermeable to liquid water and that can form a breathable film, for example, in which the polymer is capable of absorbing and desorbing water vapor and providing a barrier to aqueous fluids (e.g., water, blood, etc.). For example, a highly breathable polymer can absorb water vapor from one side of a film and release it to the other side of film, thereby allowing the water vapor to be transported through the film. As the highly breathable polymer can impart breathability to films, films formed from such polymers do not need to include pores (e.g., monolithic film). According to certain embodiments of the invention, "highly breathable polymer" may comprise any thermoplastic polymer or elastomer having a moisture vapor transmission rate (MVTR) of at least 500 $g/m^2$/day when formed into a film. According to certain embodiments of the invention, "highly breathable polymer" may comprise any thermoplastic polymer or elastomer having a MVTR of at least 750 $g/m^2$/day or of at least 1000 $g/m^2$/day when formed into a film, such as a film having, for example, a thickness of about 25 microns or less. According to certain embodiments of the invention, highly breathable polymers may comprise, for example, any one or combination of a polyether block amide copolymer (e.g., PEBAX® from Arkema Group), polyester block amide copolymer, copolyester thermoplastic elastomer (e.g., ARNITEL® from DSM Engineering Plastics, HYTREL® from E.I. DuPont de Nemours and Company), or thermoplastic urethane elastomer (TPU).

The term "microporous" film, as used herein, may comprise a polymeric film layer hiving a plurality of micropores dispersed throughout a body of the film. Microporous films, for example, may generally be produced by dispersing finely divided particles of a non-hygroscopic filler material, such as an inorganic salt (e.g., calcium carbonate), into a suitable polymer followed by forming a film of the filled polymer and stretching the film to provide good porosity and water vapor absorption or transmission. For example, microporous film breathability may be dependent on the formation of a tortuous porous path throughout the film via the stretching of the filler impregnated film to impart the desired porosity (e.g., pore formation). Furthermore, the barrier properties of such microporous films are affected by the surface tension of the liquid to which they are exposed (e.g., they are more easily penetrated by isopropyl alcohol than by water), and they transmit odor more easily than solid films (e.g., monolithic films).

The term “layer”, as used herein, may comprise a generally recognizable combination of similar material types and/or functions existing in the X-Y plane.

All whole number end points disclosed herein that can create a smaller range within a given range disclosed herein are within the scope of certain embodiments of the invention. By way of example, a disclosure of from about 10 to about 15 includes the disclosure of intermediate ranges, for example, of: from about 10 to about 11; from about 10 to about 12; from about 13 to about 15; from about 14 to about 15; etc. Moreover, all single decimal (e.g., numbers reported to the nearest tenth) end points that can create a smaller range within a given range disclosed herein are within the scope of certain embodiments of the invention. By way of example, a disclosure of from about 1.5 to about 2.0 includes the disclosure of intermediate ranges, for example, of: from about 1.5 to about 1.6; from about 1.5 to about 1.7; from about 1.7 to about 1.8; etc.

Figure 1B:
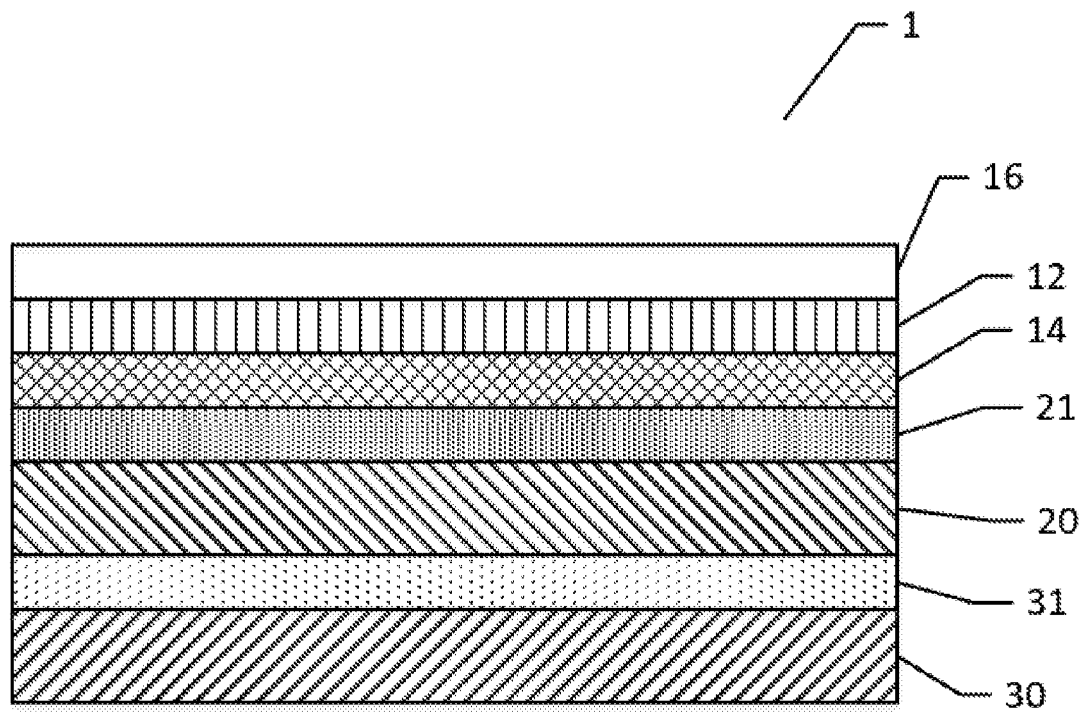
FIG. 1B illustrates a metalized material in which a film layer is adhesively bonded to a nonwoven layer, in accordance with certain embodiments of the invention.

In one aspect, the present invention provides a metalized material including the following: (i) a substrate comprising a nonwoven, a film, or a combination thereof; (ii) a metal coating layer (MCL); and (iii) a transparent coating layer (TCL); wherein the MCL is located directly or indirectly between the substrate and the TCL. Optionally, a protective layer, which is discussed in more detail below, may be located between the substrate and the MCL. In accordance with certain embodiments of the invention, the substrate may comprise a composite including, for example, a first nonwoven layer and a first film layer. For instance, the composite may comprise the first film layer melt extruded directly onto the first nonwoven layer. FIG. 1, for instance, illustrates a metalized material 1, in which the substrate comprises a first nonwoven layer 20 and a first film layer 30. As shown in FIG. 1A, the first film layer 30 is melt extruded directly onto the first film layer 20 (e.g., the interface between the two is devoid of an adhesive). An adhesive layer 21 (e.g., a second adhesive layer) is located directly between the first nonwoven layer 20 and a protective coating 14. As also shown in FIG. 1A, the metalized material 1 includes a MCL 12 located directly between the protective coating 14 and a TCL 16. Alternatively, the composite may comprise a first adhesive layer located between and bonding the first nonwoven layer and the first film layer. FIG. 1B, for example, illustrates a metalized material 1 similar to that of FIG. 1A, but includes a first adhesive layer 31 located directly between the first nonwoven layer 20 and the first film layer 30.

In accordance with certain embodiments of the invention, the metalized material includes a first adhesive layer located between the first film layer and the first nonwoven layer, in which the first adhesive layer comprises a first discontinuous pattern. A discontinuous adhesive pattern, for example, may mitigate a reduction in breathability by virtue of the inclusion of non-adhesive regions that will not inhibit the passage of water vapor. For example, the first discontinuous pattern may comprise a first plurality of discrete islands of adhesive surrounded by regions devoid of adhesive. For example, the first discontinuous pattern may comprise a continuous non-adhesive region with a plurality of islands of adhesive surrounded by the continuous non-adhesive region. Alternatively, the first discontinuous pattern may comprise a first plurality of discrete islands that are devoid of adhesive and surrounded by regions of adhesive. The region of adhesive may comprise a continuous network of adhesive. In accordance with certain embodiments of the invention, the first adhesive layer may comprise a first discontinuous pattern, in which the first discontinuous pattern may comprise a first plurality of separate and distinct lines of adhesive. For instance, the first plurality of separate and distinct lines of adhesive may be straight, arcuate, or have a zig-zag configuration. Alternatively to a discontinuous adhesive pattern, the first adhesive layer may comprise a first continuous coating, in which the first continuous coating covers substantially all of an interface between the first nonwoven layer and the first film layer.

In accordance with certain embodiments of the invention, the first adhesive layer may have a basis weight from about 0.2 to about 5 gsm, such as at least about any of the following: 0.25, 0.5, 0.75, 1, 1.5, 2 and 2.5 gsm, and/or at most about any of the following: 5, 4, 3, and 2.5 gsm. Additionally or alternatively, the first adhesive layer may comprise a variety of adhesive materials. Non-limiting example, for instance, include a moisture-proof pressure sensitive adhesive, an acrylic holt melt adhesive, or combinations thereof.

In accordance with certain embodiments of the invention, the nonwoven (e.g., the first nonwoven layer) may comprise one or more spunbond layers, one or more meltblown layers, one or more needlepunched layers, one or more hydroentangled layers, one or more carded layer, one or more air-laid layers, one or more wet-laid layers, one or more sub-micron layers, or any combinations thereof. For example, the nonwoven (e.g., the first nonwoven layer) may comprise a spunbond-meltblown-spunbond (SMS) structure, in which each ‘S’ may include from about 1 to about 5 spunbond layers and the ‘M’ may include from about 1 to about 5 meltblown layers. In accordance with certain embodiments of the invention, the nonwoven (e.g., the first nonwoven layer) may comprise one or more synthetic polymers, such as one or more polyolefins (e.g., a polypropylene, a polyethylene, etc.), one or more polyesters, one or more polyamides, or any combination thereof. In yet another example, the nonwoven (e.g., the first nonwoven layer) may also comprise natural and/or synthetic cellulosic fibers, such as cotton, pulp, viscose, and rayon. For example, one or more layers include natural and/or synthetic cellulosic fibers may be sandwiched between two spunbond layers. Additionally or alternatively, the nonwoven (e.g., the first nonwoven layer) may be provided as a nonwoven web (e.g., non-consolidated) or as a nonwoven fabric that has been consolidated by any means disclosed herein. For example, the nonwoven fabric may be consolidated by thermal calendering, ultrasonic bonding, mechanical bonding (e.g., hydroentangling), chemical bonding, or any combination thereof).

In accordance with certain embodiments of the invention, the nonwoven (e.g., the first nonwoven layer) may comprise a basis weight from about 5 to about 500 gsm, such as at least about any of the following: 5, 6, 8, 10, 12, 15, 25, 50, 75, 100, 150, 200, and 250 gsm, and/or at most about any of the following: 500, 450, 400, 350, 300, and 250 gsm.

In accordance with certain embodiments of the invention, the film (e.g., the first film layer) may comprise a single layer microporous film or a single layer monolithic film. Alternatively, the film (e.g., the first film layer) may comprise a multilayer film including one or more microporous films and/or one or more monolithic films. The film (e.g., the first film layer) may comprise an average thickness from about 5 to about 150 microns, such as at least about any of the following: 5, 10, 15, 20, 25, 30, 40, 50, 60, 70, and 75 microns, and/or at most about any of the following: 150, 125, 100, 90, 80, and 75 microns.

In accordance with certain embodiments of the invention, the film (e.g., the first film layer) may comprise a moisture vapor transmission rate (MVTR) of at least about 25 g/m$^2$ per 24 hours as determined by ASTM E96D, such as at least about any of the following: 25, 50, 75, 100, 125, 150, 175, and 200 g/m$^2$ per 24 hours as determined by ASTM E96D, and/or at most about any of the following: 500, 450, 400, 350, 300, 275, 250, 225, and 200 g/m$^2$ per 24 hours as determined by ASTM E96D. Additionally or alternatively, the film (e.g., the first film layer) may comprise a hydrostatic head (HSH) of at least about 50 mbar as determined by AATCC 127 (60 mbar/min), such as at least about any of the following: 50, 60, 75, 80, 100, and 125 mbar as determined by AATCC 127 (60 mbar/min), and/or at most about any of the following: 200, 175, 150, and 125 mbar as determined by AATCC 127 (60 mbar/min).

In accordance with certain embodiments of the invention, the film (e.g., the first film layer) may comprise a synthetic polymer, such as one or more polyolefins (e.g., a polypropylene, a polyethylene, etc.), one or more polyesters, or combinations thereof, and/or one or more biopolymers, such as one or more polylactic acids.

Figure 2:
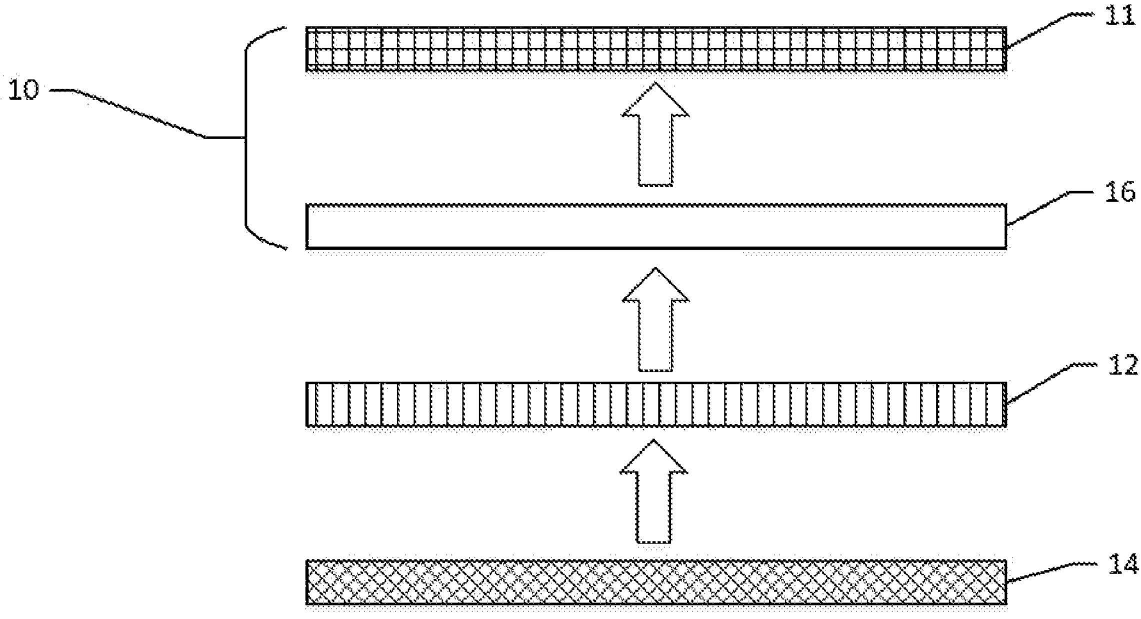
FIG. 2 illustrates an expanded view of a non-conductive metalized layer in accordance with certain embodiments of the invention.

As noted above, the metalized material may comprise a protective coating located between the MCL and the substrate. FIG. 2, for instance, an expanded view of a non-conductive metalized layer, in accordance with certain embodiments of the invention, that includes a release liner 10 comprising a carrier layer 11 and the TCL 16. The TCL 16 is sandwiched directly between the carrier layer 11 and the MCL 12. FIG. 2 illustrates example embodiments that include an optional protective coating layer 14. In accordance with certain embodiments of the invention, the carrier layer may comprise a polyester, a polyvinyl chloride, a polypropylene, a polyethylene, a thermoplastic polyurethane, paper, or any combination thereof. In this regard, a first bond strength between the carrier layer and the TCL is less than a second bond strength between the TCL and the MCL. Accordingly, the carrier layer may be removed or separated from the TCL, which acts or functions as a release coating in this aspect, while the TCL remains bonded to the MCL. The TCL, for example, may comprise a thermal peel release coating or a cold peel release coating. The TCL, for example, may have a bright-type finish, a flat-type finish, or a matte-type to provide bright, flat, and matte appearances. As noted herein, the TCL may comprise, for example, a cellulose acetate-based, a silicone-based, and/or a fluoride-based material. As also described herein, the TCL generally is transparent to utilize the highly reflective properties of the MCL.

Figure 3:
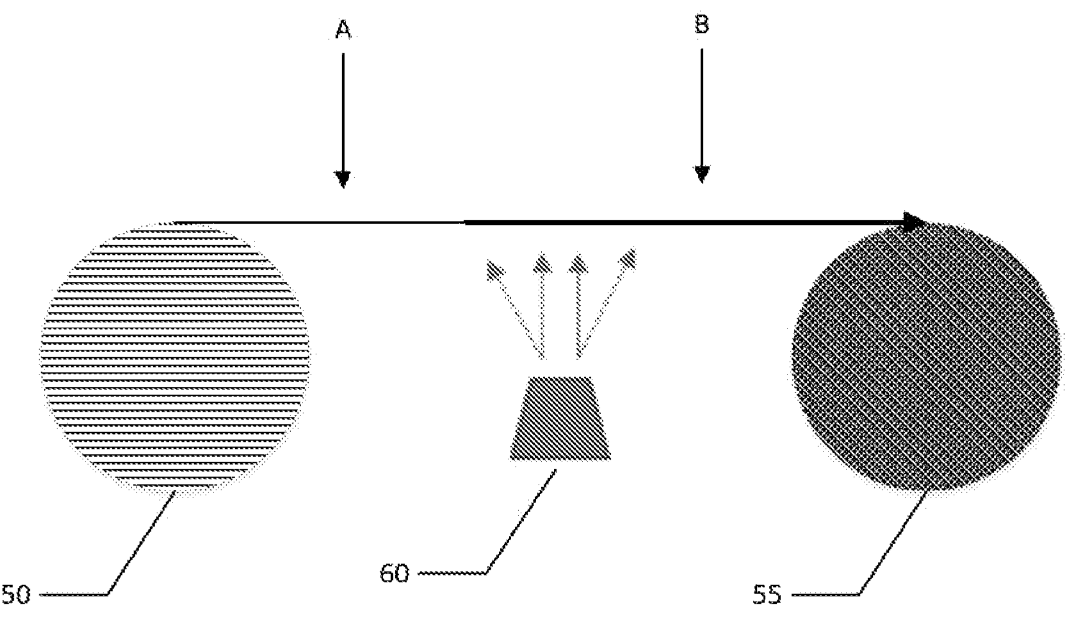
FIG. 3 illustrates a process of depositing a metal coating layer (MCL) onto a release liner, which includes a carrier layer and a transparent coating layer (TCL)/release coating, in accordance with certain embodiments of the invention.

FIG. 3 illustrates a process of depositing a MCL onto a release liner, which includes a carrier layer and a TCL (e.g., a release coating), in accordance with certain embodiments of the invention. As shown in FIG. 3, a roll of a release liner 50, which includes the carrier layer 11 and the TCL 16 that are collectively identified as 'A' in FIG. 3, is unwound and conveyed through or past a vacuum coating operation 60, in which the MCL is deposited directly onto the TCL layer 16. The metal-coated release liner, which includes the carrier layer 11, the TCL 16, and the MCL 12 is collectively identified as 'B' in FIG. 3, may be collected on a wind-up roll 55.

In accordance with certain embodiments of the invention, the protective coating may comprise a variety of material. Non-limiting examples of the protective coating may comprise an alkyd coating, an epoxy coating, a polyester coating, an acrylate coating, a polyurethane coating, or combinations thereof. Additionally or alternatively, the protective coating may have an average thickness from about 5 to about 150 microns, such as at least about any of the following: 5, 10, 15, 20, 25, 30, 40, 50, 60, 70, and 75 microns, and/or at most about any of the following: 150, 125, 100, 90, 80, and 75 microns. Additionally or alternatively, the protective coating may have a basis weight of at least about 0.2 gsm, such as at least about any of the following: 0.2, 0.4, 0.5, 0.75, 1, 1.5, and 2 gsm, and/or at most about any of the following: 5, 4, 3.5, 3, 2.5, and 2 gsm.

In accordance with certain embodiments of the invention, the metalized material may also comprise a second adhesive layer located between and bonding the protective coating to the substrate, such as directly bonded to the nonwoven via the second adhesive layer. For example, the second adhesive layer may comprise a second discontinuous pattern, wherein the second discontinuous pattern may comprise a second plurality of discrete islands of adhesive surrounded by regions devoid of adhesive. Alternatively, the second adhesive layer may comprise a second discontinuous pattern, wherein the second discontinuous pattern comprises a second plurality of discrete islands that are devoid of adhesive and surrounded by regions of adhesive. In accordance with certain embodiments of the invention, the second discontinuous pattern may comprise a second plurality of separate and distinct lines of adhesive, and which the second plurality of separate and distinct lines of adhesive may be straight, arcuate, or have a zig-zag configuration. Alternatively, the second adhesive layer comprises a second continuous coating, in which the second continuous coating covers substantially all of an interface between the first nonwoven layer and the protective coating.

In accordance with certain embodiments of the invention, the second adhesive layer may comprise a variety of adhesive materials. Non-limiting examples, for instance, include a thermal set or cross-linked methacrylate adhesive, a moisture-cured reactive polyurethane, a moisture-proof pressure sensitive adhesive, an acrylic holt melt adhesive, or combinations thereof. Additionally or alternatively, the second adhesive layer may have a basis weight from about 1 to about 10 gsm, such as at least about any of the following: 1, 2, 3, 4, and 5 gsm, and/or at most about any of the following: 10, 9, 8, 7, 6, and 5 gsm.

In accordance with certain embodiments of the invention, the protective layer may be located directly between and adjacent the MCL and the second adhesive layer, and the second adhesive layer may be located directly between and adjacent the protective layer and the substrate (e.g., the first nonwoven layer).

As noted above, the MCL comprises a highly reflective metal or highly reflective metal alloy. The highly reflective metal or highly reflective metal alloy reflects at least about 80% of electromagnetic radiation across all wavelengths from about 1 to about 20 microns, such as across all wavelengths from about 8 to about 15 microns; or such as at least about 85%, or at least about 90%, or at least about 95% of electromagnetic radiation across all wavelengths from about 1 to about 20 microns, such as across all wavelengths from about 8 to about 15 microns (e.g., 12 microns). In accordance with certain embodiments of the invention, the highly reflective metal or highly reflective metal alloy may comprise aluminum or an alloy thereof, gold or an alloy thereof, copper or an alloy thereof, silver or an alloy thereof, or any combination thereof. In accordance with certain embodiments of the invention, the MCL may have an average thickness from about 100 nm to about 1,000 nm, such as at least about any of the following: 100, 200, 300, 400, and 500 nm, and/or at most about any of the following: 1000, 900, 800, 700, 600, and 500 nm Additionally or alternatively, the MCL has been formed by a vacuum coating method, such as by thermal evaporation, E-beam evaporation, sputtering, arc ion plating, plasma enhanced chemical vapor deposition, or atomic layer deposition.

In accordance with certain embodiments of the invention, the TCL is directly adjacent the MCL. The TCL, for example, may be at least 75% transparent, such as at least 80%, 85%, 90%, 95%, or 99% transparent, to electromagnetic radiation across all wavelengths from about 1 to about 20 microns, such as across all wavelengths from about 8 to about 15 microns, such as across all wavelengths from about 10 to about 14 microns (e.g., 12 microns). As noted above, the TCL may comprise a cellulose acetate-based material, a silicone-based material, a fluoride-based material, or combinations thereof.

In accordance with certain embodiments of the invention, the metalized material may have a moisture vapor transmission rate (MVTR) of at least about 25 $g/m^2$ per 24 hours as determined by ASTM E96D, such as at least about any of the following: 25, 50, 75, 100, 125, 150, 175, and 200 $g/m^2$ per 24 hours as determined by ASTM E96D, and/or at most about any of the following: 500, 450, 400, 350, 300, 275, 250, 225, and 200 $g/m^2$ per 24 hours as determined by ASTM E96D. Additionally or alternatively, the metalized material may have a hydrostatic head (HSH) of at least about 50 mbar as determined by AATCC 127 (60 mbar/min), such as at least about any of the following: 50, 60, 75, 80, 100, and 125 mbar as determined by AATCC 127 (60 mbar/min), and/or at most about any of the following: 200, 175, 150, and 125 mbar as determined by AATCC 127 (60 mbar/min). Additionally or alternatively, the metalized material may reflect at least about 80% of electromagnetic radiation across all wavelengths from about 1 to about 20 microns, such as across all wavelengths from about 8 to about 15 microns or from about 10 to about 13 microns (e.g., 12 microns); or such as at least about 85%, or at least about 90%, or at least about 95% of electromagnetic radiation across all wavelengths from about 1 to about 20 microns, such as across all wavelengths from about 8 to about 15 microns or from about 10 to about 13 microns (e.g., 12 microns).

In accordance with certain embodiments of the invention, the metalized material is electrically non-conductive. As noted above, the TCL may define a first outermost layer of the metalized material and a film layer (e.g., a first film layer) may define a second outermost layer of the metalized material, in which the MCL constitutes at least one layer between the two outermost layers of the metalized materials. For example, the metalized material may comprise a product composite including a MCL encased directly or indirectly between the TCL and the substrate or other optional intermediate layers and described herein. In this regard, the MCL is not directly exposed to an external environment. As such, the MCL is shielded from external environments and severely mitigates or eliminates any electrical conductivity that may otherwise be associated with a MCL. The metalized material, for instance, may be a non-conductive metalized material as the MCL will not be in contact with the external environment. For example, the MCL is not an electrical hazard, for example, in an operating room environment. In accordance with certain embodiments of the invention, the metalized material has an electrical conductivity of less than about $5.0\times10^{-11}$ S/m (or electrical resistivity more than about $1.0\times10^{9}$ Ω·m), such as less than about $4.0\times10^{-11}$ S/m, or less than about $3.0\times10^{-11}$ S/m, or less than about $2.0\times10^{-11}$ S/m, or less than about $1.0\times10^{-11}$ S/m as determined according to IST 40.1 (i.e., test method for surface resistivity, which is the reciprocal of the surface conductivity).

In another aspect, the present invention provides a peelable metalized material, in which the peelable metalized material comprises a metalized material as described and disclosed herein, and a removable carrier layer located directly adjacent to the TCL. For instance, the carrier layer may be selectively removed or peeled away leaving behind the TCL. In accordance with certain embodiments of the invention, the carrier layer may comprise an average thickness from about 25 to about 100 microns, such as at least about any of the following: 25, 30, 40 and 50 microns, and/or at most about any of the following: 100, 90, 80, 70, 60, and 50 microns. Additionally or alternatively, the carrier layer may comprise a polyester, a polyvinyl chloride, a polypropylene, a polyethylene, a thermoplastic polyurethane, paper, or any combination thereof. As noted above, the peelable metalized material may include a first bond strength between the carrier layer and the TCL and a second bond strength between the TCL and the MCL, in which the second bond strength is larger than the first bond strength. Accordingly, the carrier layer may be removed (e.g., peeled away) to leave the TCL bonded to the MCL such that the TCL defines one of the outermost layers of the metalized material.

In another aspect, the present invention provides a method of producing a peelable metalized material comprising the following: (i) providing or forming a metal-containing intermediate material comprising (a) a carrier layer, (b) a transparent coating layer (TCL) located directly adjacent the carrier layer; (c) a metal coating layer (MCL) located directly adjacent the TCL, and (d) optionally a protective coating directly or indirectly adjacent the MCL, wherein the MCL is located between the protective coating and the TCL; (ii) providing or forming a substrate comprising at least one nonwoven, at least one film, or a combination thereof; and (iii) bonding the metal-containing intermediate material to the substrate to provide the peelable metalized material, such as disclosed and described herein.

In accordance with certain embodiments of the invention, the method may comprise forming the metal-containing intermediate material, which may comprise (a) providing or forming a carrier layer, (b) depositing a TCL directly onto the carrier layer; (c) depositing a MCL directly onto the TCL, and (d) optionally depositing a protective coating directly or indirectly onto the MCL. FIG. 3, as discussed above, illustrates a method of forming a metal-containing intermediate material. Although FIG. 3 does not show the deposition of the optional protective coating, the protective coating can be applied over the MCL by roll coating, knife coating, die coating, spray coating, or printing. As noted above, the MCL may be deposited directly onto the TCL by a vacuum coating method, such as by thermal evaporation, E-beam evaporation, sputtering, arc ion plating, plasma enhanced chemical vapor deposition, or atomic layer deposition. The step of forming the substrate may comprise, for example, producing a composite including a first nonwoven layer and a first film layer. In accordance with certain embodiments of the invention, the step of producing the composite may comprise melt extruding the first film layer directly onto a first side of the first nonwoven layer. Alternatively, the step of producing the composite may comprise adhesively bonding the first film layer onto a first side of the first nonwoven via a first adhesive layer as noted above. For example, the first adhesive layer may be formed by roll coating, knife coating, die coating, or spray coating.

In accordance with certain embodiments of the invention, the step of bonding the metal-containing intermediate material to the substrate to provide the peelable metalized material may comprise adhesively bonding the metal-containing intermediate material directly to the substrate via a second adhesive layer, as discussed above. In accordance with certain embodiments of the invention, for example, the second adhesive layer may be deposited onto the substrate (e.g., directly onto the first nonwoven layer), followed by lamination of the substrate and the metal-containing intermediate material, in which the second adhesive layer is located between and adjacent the substrate and the MCL or between and adjacent the substrate and the optional protective layer. In accordance with certain embodiments of the invention, for example, the second adhesive layer may be deposited onto the metal-containing intermediate material, followed by lamination of the substrate and the metal-containing intermediate material, in which the second adhesive layer is located between and adjacent the substrate and the MCL or between and adjacent the substrate and the optional protective layer. In accordance with certain embodiments of the invention, the second adhesive layer is located between and adjacent the first nonwoven layer and the MCL or between and adjacent the first nonwoven layer and the optional protective layer.

In accordance with certain embodiments of the invention, the substrate may comprise a first nonwoven layer, and wherein bonding the metal-containing intermediate material to the substrate comprises adhesively bonding the first nonwoven layer directly to the MCL or to the optional protective layer via a second adhesive layer. The method may also comprise bonding a first film layer to the first nonwoven layer subsequent to the step of bonding the first nonwoven directly to the MCL or to the optional protective layer vie a second adhesive layer. For example, the step of bonding the first film layer to the first nonwoven layer may comprise melt extruding the first film layer directly onto a first side of the first nonwoven layer. Alternatively, bonding the first film layer to the first nonwoven layer may comprise adhesively bonding the first film layer onto a first side of the first nonwoven via a first adhesive layer, as noted above.

Figure 4A:
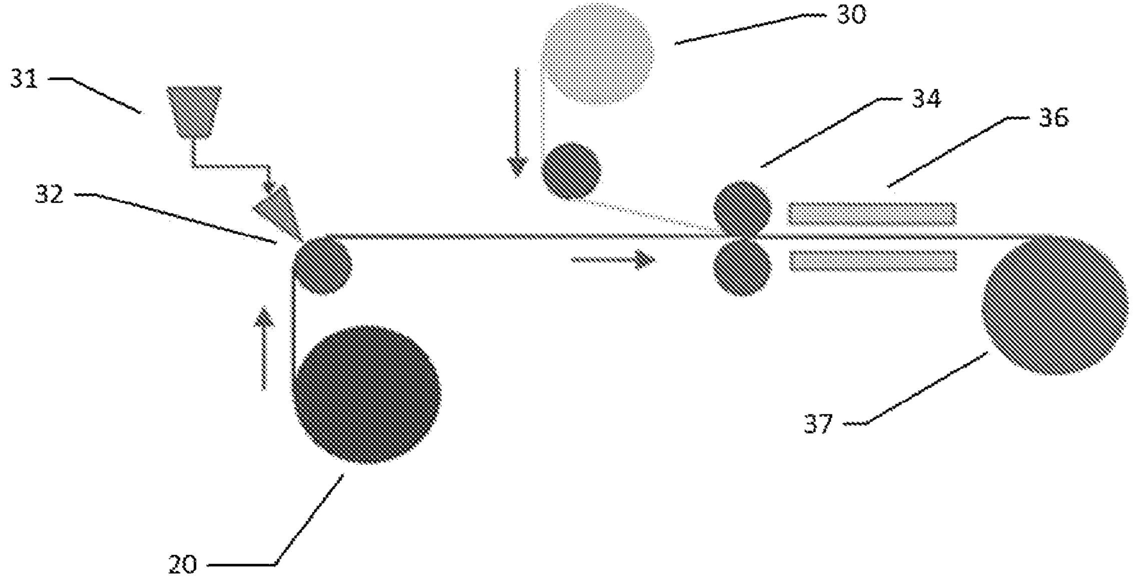
FIG. 4A illustrates a process for forming a composite as a substrate for use in a metalized material in accordance with certain embodiments of the invention.

FIG. 4A illustrates a process for forming a composite as a substrate for use in a metalized material in accordance with certain embodiments of the invention. As shown in FIG. 4A, a roll containing a first nonwoven layer 20 is unwound and conveyed past a first adhesive application location 32, in which the first adhesive 31 is deposited onto the first nonwoven layer. After deposition of the first adhesive 31 onto the first nonwoven layer 20, the adhesively coated first nonwoven layer is adhesively laminated at operation 34 to the first film layer 30 (e.g., a breathable film layer) followed by a drying and/or cooling operation 36, and collected on a composite roll 37. In this regard, FIG. 4A illustrates an example embodiment in which the first nonwoven layer and the first film layer are adhesively bonded together. Although FIG. 4A illustrates a step of applying the adhesive to the first nonwoven layer followed by lamination/bonding with the first film layer, the adhesive may alternatively or also coated onto the first film layer followed by lamination/bonding with the first nonwoven layer.

Figure 4B:
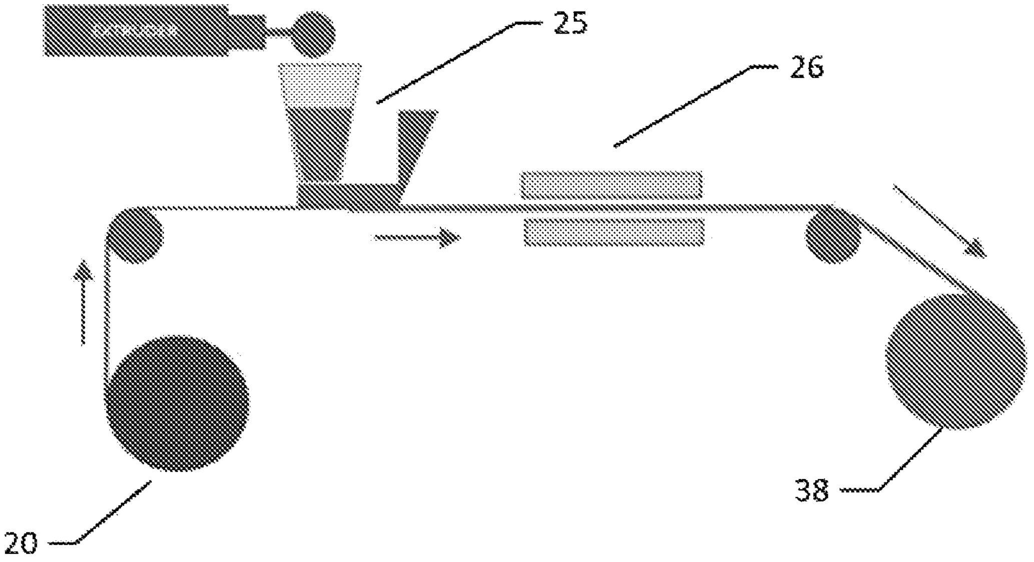
FIG. 4B illustrates another process for forming a composite as a substrate for use in a metalized material in accordance with certain embodiments of the invention.

FIG. 4B illustrates another process for forming a composite as a substrate for use in a metalized material in accordance with certain embodiments of the invention. As shown in FIG. 4A, a roll containing a first nonwoven layer 20 is unwound while a first film layer 25 is melt extruded directly onto the first nonwoven layer 20. Subsequently, the freshly formed composite may undergo a drying and/or cooling operation 26 and collected on a composite roll 38.

Figure 5A:
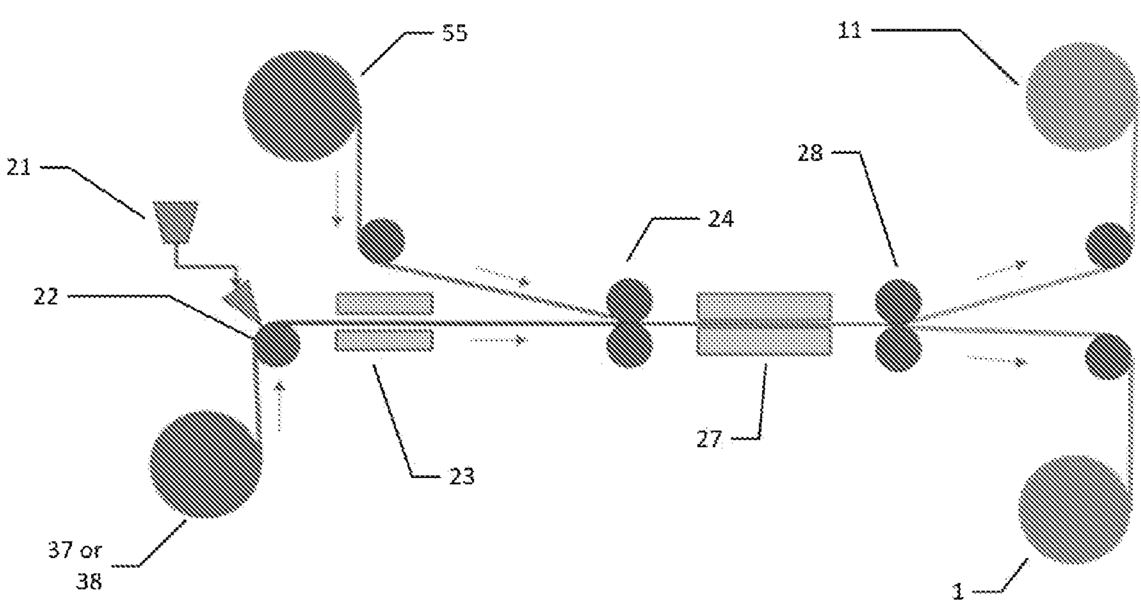
FIG. 5A illustrates a process of transferring the MCL to the substrate followed by removal of the carrier layer in accordance with certain embodiments of the invention.

As shown in FIG. 5A, the composite roll 37 or 38 may be unwound and conveyed past a second adhesive location 22 in which a second adhesive 21 is deposited onto the first nonwoven layer of the composite followed by a heating operation 23. Subsequently to the heating operation 23, which may harden or cure the second adhesive, the adhesively coated composite is laminated/bonded at operation 24 to the metal-containing intermediate material 55 and subsequently subjected to a drying and/or cooling operation 27 to provide a peelable metalized material.

Figure 5B:
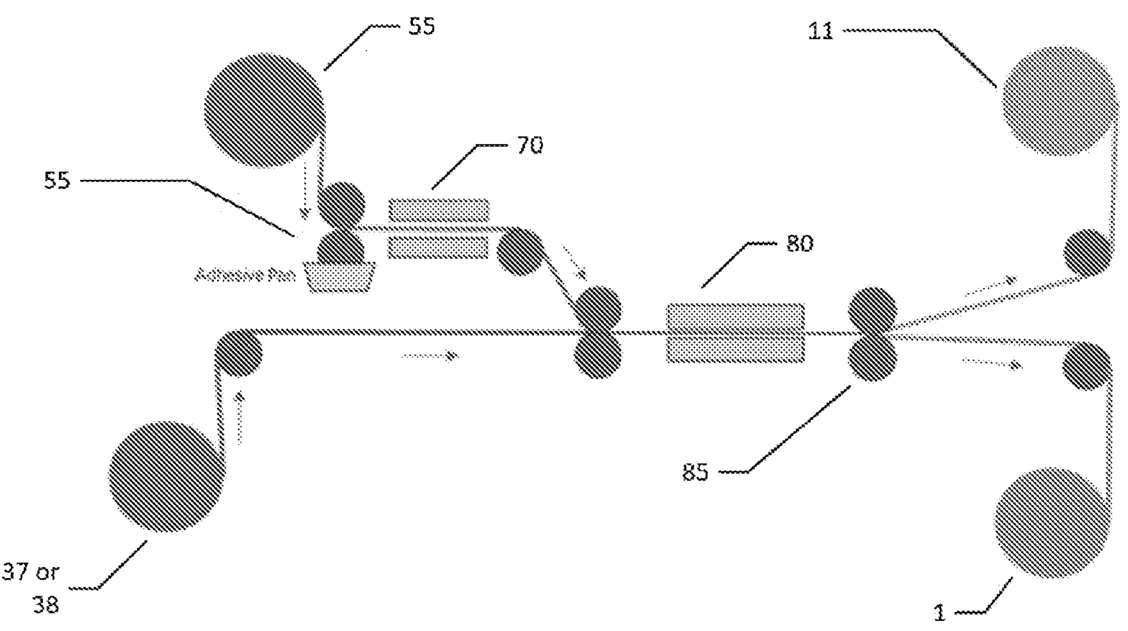
FIG. 5B illustrates another process of transferring the MCL to the substrate followed by removal of the carrier layer in accordance with certain embodiments of the invention.

As shown in FIG. 5B, metal-containing intermediate material 55 may be unwound and conveyed past a third adhesive location 65 in which a second adhesive is deposited onto the protective coating (if present) or the MCL (if not protective coating is present) of the metal-containing intermediate material and subsequently subjected to a heating operation 70, which may harden or cure the second adhesive. Next, the adhesively coated metal-containing intermediate material is laminated/bonded to the composite 37 or 38 and subsequently subjected to a drying and/or cooling operation 80 to provide a peelable metalized material.

In still yet another aspect, the present invention provides a method of producing a metalized material comprising the following: (i) providing a peelable metalized material, such as those described and disclosed herein, or forming a peelable metalized material by a method such as those described and disclosed herein; and (ii) removing the carrier layer to provide a metalized material, such as described and disclosed herein. For example, the method may comprise removing the carrier layer via a delamination process, wherein the carrier layer is separated from the TCL and the TCL defines a first outermost layer of the metalized material.

FIG. 5A, for example, illustrates a delamination step 28, in which the carrier layer is separated from and collected on a carrier roll 11 and the remaining metalized material 1 is collected on a separate roll. Similarly, FIG. 5B illustrates a delamination step 85, in which the carrier layer is separated from and collected on a carrier roll 11 and the remaining metalized material 1 is collected on a separate roll.

EXAMPLES

The present disclosure is further illustrated by the following examples, which in no way should be construed as being limiting. That is, the specific features described in the following examples are merely illustrative and not limiting.

Example 1

Raw Materials:

A 25 micron release liner including a transparent PET carrier layer with bright type cellulose acetate transparent coating layer (TCL) as a release coating. The metal utilized for forming the MCL was a 99.80% purity aluminum wire. The protective coating was formed from an acrylate-based material. A composite substrate was used, in which the nonwoven layer was a 9 gsm SMS nonwoven that was adhesively bonded to a 12 gsm breathable polyethylene film layer via an acrylic hot melt adhesive. The SMS nonwoven was adhesively bonded to the protective coating via a cross-linked methacrylate adhesive.

Figure 6:
FIG. 6 is an image of an example metalized material, in which the MCL is visible through the TCL.

Process:

A 5,000 Å aluminum MCL was formed onto the cellulose acetate-based TCL, which was deposited onto the PET carrier layer, by a roll-to-roll thermal evaporation machine. A 2 gsm acrylate based protective coating was coated onto the MCL by roll coating. Next, a 9 gsm nonwoven fabric layer way bonded to a 12 gsm breathable PE film by spray coating with 2 gsm of an acrylic hot melt adhesive. A 4 gsm layer of an methacrylate adhesive with cross-link was coated onto the nonwoven side of the nonwoven-film composite formed above by roll coating. Next, the protective coating that is covering the MCL was laminated/bonded to the SMS nonwoven web via the methacrylate adhesive with cross-link, coupled with pressing and curing. Finally, the carrier layer was removed by a delamination process, in which the carrier layer (i.e., the PET) was wound-up on a first spool and the resulting metalized material was wound-up on a second roll. The testing results for the metalized material are summarized in Table 1. FIG. 6 is an image of the resulting metalized material, in which the MCL is visible through the TCL.

TABLE 1

| Property | Test Method | Unit | Bright Silver Appearance Metalized Nonwoven with Breathable PE Film |
|---|---|---|---|
| Basis Weight | ASTM 3776 | gsm | 29.836 |
| MD Tensile Strength | ASTM 5035 | N | 50.106 |
| MD Elongation | 300 mm/min | % | 39.19 |
| CD Tensile Strength | | N | 18.086 |
| CD Elongation | | % | 55.778 |
| Surface Resistance (The Non-conductive Metal Side) | IST 40.1 50% RH & 23° C. | GΩ | 14 |
| Thickness | IST120.1 area: 2500 mm, pressure: 300CN | mm | 0.05 |
| Moisture Vapor Transmission Rate | ASTM E96D | g/ $m^2$ • 24 h | 33.16 |
| Handle-O-Meter (Flexibility) | MD IST90.3 Gap ¼ inch | g | 7.22 |
| ¼ inch | CD IST90.3 Gap ¼ inch | g | 6.46 |
| HSH | AATCC 127 60 mbar/min | mbar | 71.83 |

Example 2

Raw Materials:

A 30 micron release liner including a transparent PVC carrier layer with matte type cellulose acetate transparent coating layer (TCL) as a release coating. The metal utilized for forming the MCL was a 99.80% purity aluminum wire. The protective coating was formed from an acrylate-based material. A composite substrate was used, in which the nonwoven layer was a 9 gsm SMS nonwoven that was adhesively bonded to a 12 gsm breathable thermoplastic elastomer (TPE) film layer via an acrylic hot melt adhesive. The SMS nonwoven was adhesively bonded to the protective coating via a cross-linked methacrylate adhesive.

Figure 7:
FIG. 7 is an image of another example metalized material, in which the MCL is visible through the TCL.

Process:

A 6,000 Å aluminum MCL was formed onto the cellulose acetate-based TCL, which was deposited onto the PET carrier layer, by a roll-to-roll thermal evaporation machine. A 2 gsm acrylate based protective coating was coated onto the MCL by spray coating. Next, a 9 gsm nonwoven fabric layer way bonded to a 12 gsm breathable TPE film by spray coating with 2 gsm of an acrylic hot melt adhesive. A 3 gsm layer of an methacrylate adhesive with cross-link was coated onto the nonwoven side of the nonwoven-film composite formed above by roll coating. Next, the protective coating that is covering the MCL was laminated/bonded to the SMS nonwoven web via the methacrylate adhesive with cross-link, coupled with pressing and curing. Finally, the carrier layer was removed by a delamination process, in which the carrier layer (i.e., the PET) was wound-up on a first spool and the resulting metalized material was wound-up on a second roll. The testing results for the metalized material are summarized in Table 2. FIG. 7 is an image of the resulting metalized material, in which the MCL is visible through the TCL.

TABLE 2

| Property | Test Method | Unit | Matte Silver Appearance Metalized Nonwoven with TPE Film |
|---|---|---|---|
| Basis Weight | ASTM 3776 | gsm | 30.388 |
| MD Tensile Strength | ASTM 5035 | N | 54.676 |
| MD Elongation | 300 mm/min | % | 49.956 |
| CD Tensile Strength | | N | 19.738 |
| CD Elongation | | % | 66.74 |
| Surface Resistance (The Non-conductive Metal Side) | IST 40.1 50% RH & 23° C. | GQ | 10 |
| Thickness | IST120.1 area: 2500 mm, pressure: 300CN | mm | 0.054 |
| Moisture Vapor Transmission Rate | ASTM E96D | g/ $m^2$ • 24 h | 292.20 |
| Handle-O-Meter (Flexibility) | MD IST90.3 Gap ¼ inch | g | 6.48 |
| ¼ inch | CD IST90.3 Gap ¼ inch | g | 5.56 |
| HSH | AATCC 127 60 mbar/min | mbar | 125.58 |

Example 3

Raw Materials:

A 75 micron release liner including a paper carrier layer with matte type silicone-based transparent coating layer (TCL) as a release coating. The metal utilized for forming the MCL was a 99.80% purity aluminum wire. The protective coating was formed from an acrylate-based material. A composite substrate was used, in which the nonwoven layer was a 9 gsm SMS nonwoven that had a 12 gsm casting PE film layer melt extruded thereon. The SMS nonwoven was adhesively bonded to the protective coating via a cross-linked methacrylate adhesive.

Figure 8:
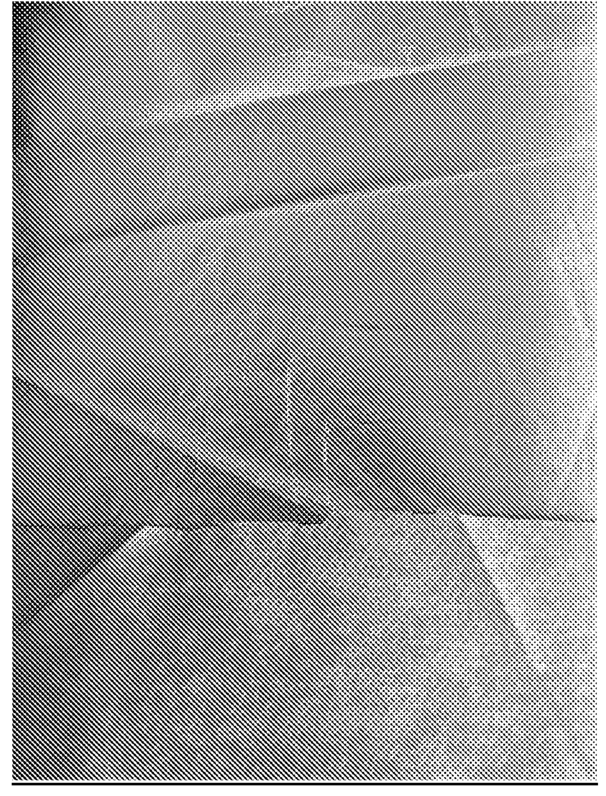
FIG. 8 is an image of another example metalized material, in which the MCL is visible through the TCL.

Process:

A 4,000 Å aluminum MCL was formed onto the silicone-based TCL, which was deposited onto the paper carrier layer, by a roll-to-roll thermal evaporation machine. A 1 gsm acrylate based protective coating was coated onto the MCL by roll coating. Next, a 12 gsm PE film was melt extruded directly onto the 9 gsm nonwoven fabric. A 5 gsm layer of an methacrylate adhesive with cross-link was coated onto the nonwoven side of the nonwoven-film composite formed above by roll coating. Next, the protective coating that is covering the MCL was laminated/bonded to the SMS nonwoven web via the methacrylate adhesive with cross-link, coupled with pressing and curing. Finally, the carrier layer was removed by a delamination process, in which the carrier layer (i.e., the paper) was wound-up on a first spool and the resulting metalized material was wound-up on a second roll. The testing results for the metalized material are summarized in Table 3. FIG. 8 is an image of the resulting metalized material, in which the MCL is visible through the TCL.

TABLE 3

| Property | Test Method | Unit | Matte Silver Appearance Metalized Nonwoven with Casting PE Film |
|---|---|---|---|
| Basis Weight | ASTM 3776 | gsm | 30.102 |
| MD Tensile Strength | ASTM 5035 | N | 63.596 |
| MD Elongation | 300 mm/min | % | 48.946 |
| CD Tensile Strength | | N | 20.336 |
| CD Elongation | | % | 75.5 |
| Surface Resistance (The Non-conductive Metal Side) | IST 40.1 50% RH & 23° C. | GΩ | 4.6 |
| Thickness | IST120.1 area: 2500 mm, pressure: 300CN | mm | 0.04 |
| Moisture Vapor Transmission Rate | ASTM E96D | g/ $m^2$ • 24 h | 238.33 |
| Handle-O-Meter (Flexibility) | MD IST90.3 Gap 1/4 inch | g | 7.56 |
| 1/4 inch | CD IST90.3 Gap 1/4 inch | g | 6.72 |
| HSH | AATCC 127 60 mbar/min | mbar | 61.2 |

Non-Limiting Example Embodiments

The following example embodiments are for illustrative purposes only and highlight that each of the features described in this application can be interchanged with each other in a variety of different manners or configurations.

Example 1. A metalized material, comprising: (i) a substrate comprising a nonwoven, a film, or a combination thereof; (ii) a metal coating layer (MCL); and (iii) a transparent coating layer (TCL); wherein the MCL is located directly or indirectly between the substrate and the TCL.

Example 2. The metalized material of example 1, wherein the substrate comprises a composite including a first nonwoven layer and a first film layer.

Example 3. The metalized material of example 2, wherein the composite comprises the first film layer melt extruded directly onto the first nonwoven layer.

Example 4. The metalized material of example 2, wherein the composite further comprises a first adhesive layer located between and bonding the first nonwoven layer and the first film layer.

Example 5. The metalized material of example 4, wherein the first adhesive layer comprises a first discontinuous pattern, wherein the first discontinuous pattern comprises a first plurality of discrete islands of adhesive surrounded by regions devoid of adhesive.

Example 6. The metalized material of example 4, wherein the first adhesive layer comprises a first discontinuous pattern, wherein the first discontinuous pattern comprises a first plurality of discrete islands that are devoid of adhesive and surrounded by regions of adhesive.

Example 7. The metalized material of example 4, wherein the first adhesive layer comprises a first discontinuous pattern, wherein the first discontinuous pattern comprises a first plurality of separate and distinct lines of adhesive, and wherein the first plurality of separate and distinct lines of adhesive may be straight, arcuate, or have a zig-zag configuration.

Example 8. The metalized material of example 4, wherein the first adhesive layer comprises a first continuous coating, and wherein the first continuous coating covers substantially all of an interface between the first nonwoven layer and the first film layer.

Example 9. The metalized material of examples 4-8, wherein the first adhesive layer has a basis weight from about 0.2 to about 5 gsm, such as at least about any of the following: 0.25, 0.5, 0.75, 1, 1.5, 2 and 2.5 gsm, and/or at most about any of the following: 5, 4, 3, and 2.5 gsm.

Example 10. The metalized material of examples 4-9, wherein the first adhesive layer comprises a moisture-proof pressure sensitive adhesive, an acrylic holt melt adhesive, or combinations thereof.

Example 11. The metalized material of examples 1-10, wherein the nonwoven comprises one or more spunbond layers, one or more meltblown layers, one or more needlepunched layers, one or more hydroentangled layers, one or more carded layer, one or more sub-micron layers, or any combinations thereof.

Example 12. The metalized material of example 11, wherein the nonwoven comprises a spunbond-meltblown-spunbond structure.

Example 13. The metalized material of examples 11-12, wherein the nonwoven has a basis weight from about 5 to about 500 gsm, such as at least about any of the following: 5, 6, 8, 10, 12, 15, 25, 50, 75, 100, 150, 200, and 250 gsm, and/or at most about any of the following: 500, 450, 400, 350, 300, and 250 gsm.

Example 14. The metalized material of examples 11-13, wherein the nonwoven comprises a synthetic polymer, such as one or more polyolefins, one or more polyesters, one or more polyamides, or any combination thereof.

Example 15. The metalized material of examples 11-14, wherein the nonwoven comprises a natural cellulosic material, a synthetic cellulosic material, or any combination thereof.

Example 16. The metalized material of examples 1-15, wherein the film comprises a single layer microporous film or a single layer monolithic film Example 17. The metalized material of examples 1-15, wherein the film comprises a multilayer film including one or more microporous films and/or one or more monolithic films.

Example 18. The metalized material of examples 1-17, wherein the film has an average thickness from about 5 to about 150 microns, such as at least about any of the following: 5, 10, 15, 20, 25, 30, 40, 50, 60, 70, and 75 microns, and/or at most about any of the following: 150, 125, 100, 90, 80, and 75 microns.

Example 19. The metalized material of examples 1-18, wherein the film has a moisture vapor transmission rate (MVTR) of at least about 25 g/$m^2$ per 24 hours as determined by ASTM E96D, such as at least about any of the following: 25, 50, 75, 100, 125, 150, 175, and 200 g/$m^2$ per 24 hours as determined by ASTM E96D, and/or at most about any of the following: 500, 450, 400, 350, 300, 275, 250, 225, and 200 g/m$^2$ per 24 hours as determined by ASTM E96D.

Example 20. The metalized material of examples 1-19, wherein the film has a hydrostatic head (HSH) of at least about 50 mbar as determined by AATCC 127 (60 mbar/min), such as at least about any of the following: 50, 60, 75, 80, 100, and 125 mbar as determined by AATCC 127 (60 mbar/min), and/or at most about any of the following: 200, 175, 150, and 125 mbar as determined by AATCC 127 (60 mbar/min).

Example 21. The metalized material of examples 1-20, wherein the film comprises a synthetic polymer, such as one or more polyolefins, one or more polyesters, or combinations thereof, and/or one or more biopolymers, such as one or more polylactic acids.

Example 22. The metalized material of examples 1-21, further comprising a protective coating located between the MCL and the substrate.

Example 23. The metalized material of example 22, wherein the protective coating an alkyd coating, an epoxy coating, a polyester coating, an acrylate coating, a polyurethane coating, or combinations thereof.

Example 24. The metalized material of examples 22-23, wherein the protective coating has an average thickness from about 5 to about 150 microns, such as at least about any of the following: 5, 10, 15, 20, 25, 30, 40, 50, 60, 70, and 75 microns, and/or at most about any of the following: 150, 125, 100, 90, 80, and 75 microns.

Example 25. The metalized material of examples 22-24, wherein the protective coating has a basis weight of at least about 0.2 gsm, such as at least about any of the following: 0.2, 0.4, 0.5, 0.75, 1, 1.5, and 2 gsm, and/or at most about any of the following: 5, 4, 3.5, 3, 2.5, and 2 gsm.

Example 26 The metalized material of examples 22-25, further comprising a second adhesive layer located between and bonding the protective coating to the substrate, such as directly bonded to the nonwoven via the second adhesive layer.

Example 27. The metalized material of examples 22-26, wherein the second adhesive layer comprises a second discontinuous pattern, wherein the second discontinuous pattern comprises a second plurality of discrete islands of adhesive surrounded by regions devoid of adhesive.

Example 28. The metalized material of examples 22-26, wherein the second adhesive layer comprises a second discontinuous pattern, wherein the second discontinuous pattern comprises a second plurality of discrete islands that are devoid of adhesive and surrounded by regions of adhesive.

Example 29. The metalized material of examples 22-26, wherein the second adhesive layer comprises a second discontinuous pattern, wherein the second discontinuous pattern comprises a second plurality of separate and distinct lines of adhesive, and wherein the second plurality of separate and distinct lines of adhesive may be straight, arcuate, or have a zig-zag configuration.

Example 30. The metalized material of examples 22-26, wherein the second adhesive layer comprises a second continuous coating, and wherein the second continuous coating covers substantially all of an interface between the first nonwoven layer and the protective coating.

Example 31. The metalized material of examples 22-30, wherein the second adhesive layer comprises a thermal set or cross-linked methacrylate adhesive, a moisture-cured reactive polyurethane, a moisture-proof pressure sensitive adhesive, an acrylic holt melt adhesive, or combinations thereof, and wherein the second adhesive layer has a basis weight from about 1 to about 10 gsm, such as at least about any of the following: 1, 2, 3, 4, and 5 gsm, and/or at most about any of the following: 10, 9, 8, 7, 6, and 5 gsm.

Example 32. The metalized material of example 31, wherein the protective layer is located directly between and adjacent the MCL and the second adhesive layer, and the second adhesive layer is located directly between and adjacent the protective layer and the substrate.

Example 33. The metalized material of examples 1-32, wherein the MCL comprises a highly reflective metal or highly reflective metal alloy.

Example 34. The metalized material of example 33, wherein the highly reflective metal or highly reflective metal alloy reflects at least about 80% of electromagnetic radiation across all wavelengths from about 1 to about 20 microns, such as across all wavelengths from about 8 to about 15 microns; or such as at least about 85%, or at least about 90%, or at least about 95% of electromagnetic radiation across all wavelengths from about 1 to about 20 microns, such as across all wavelengths from about 8 to about 15 microns.

Example 35. The metalized material of examples 33-34, wherein the highly reflective metal or highly reflective metal alloy comprises aluminum or an alloy thereof, gold or an alloy thereof, copper or an alloy thereof, silver or an alloy thereof, or any combination thereof Example 36. The metalized material of examples 33-35, wherein the MCL has an average thickness from about 100 nm to about 1,000 nm, such as at least about any of the following: 100, 200, 300, 400, and 500 nm, and/or at most about any of the following: 1000, 900, 800, 700, 600, and 500 nm.

Example 37. The metalized material of examples 33-35, wherein the MCL has been formed by a vacuum coating method, such as by thermal evaporation, E-beam evaporation, sputtering, arc ion plating, plasma enhanced chemical vapor deposition, or atomic layer deposition.

Example 38. The metalized material of examples 1-37, wherein the TCL is directly adjacent the MCL.

Example 39. The metalized material of examples 1-38, wherein the TCL is at least 75% transparent, such as at least 80%, 85%, 90%, 95%, or 99% transparent, to electromagnetic radiation across all wavelengths from about 1 to about 20 microns, such as across all wavelengths from about 8 to about 15 microns, such as across all wavelengths from about 10 to about 14 microns.

Example 40. The metalized material of examples 1-39, wherein the TCL comprises a cellulose acetate-based material, a silicone-based material, a fluoride-based material, or combinations thereof.

Example 41. The metalized material of examples 1-40, wherein the TCL comprises a bright, flat or matte type finish.

Example 42. The metalized material of examples 1-41, wherein the metalized material has a moisture vapor transmission rate (MVTR) of at least about 25 g/m$^2$ per 24 hours as determined by ASTM E96D, such as at least about any of the following: 25, 50, 75, 100, 125, 150, 175, and 200 g/m$^2$ per 24 hours as determined by ASTM E96D, and/or at most about any of the following: 500, 450, 400, 350, 300, 275, 250, 225, and 200 g/m$^2$ per 24 hours as determined by ASTM E96D.

Example 43. The metalized material of examples 1-42, wherein the metalized material has a hydrostatic head (HSH) of at least about 50 mbar as determined by AATCC 127 (60 mbar/min), such as at least about any of the following: 50, 60, 75, 80, 100, and 125 mbar as determined by AATCC 127

(60 mbar/min), and/or at most about any of the following: 200, 175, 150, and 125 mbar as determined by AATCC 127 (60 mbar/min).

Example 44. The metalized material of examples 1-43, wherein the metalized material reflects at least about 80% of electromagnetic radiation across all wavelengths from about 1 to about 20 microns, such as across all wavelengths from about 8 to about 15 microns or from about 10 to about 13 microns; or such as at least about 85%, or at least about 90%, or at least about 95% of electromagnetic radiation across all wavelengths from about 1 to about 20 microns, such as across all wavelengths from about 8 to about 15 microns or from about 10 to about 13 microns.

Example 45. The metalized material of examples 1-44, wherein the metalized material is electrically non-conductive.

Example 46. The metalized material of examples 1-44, wherein the metalized material has an electrical conductivity of less than about $5.0\times10^{-11}$ S/m Example 47. A peelable metalized material, comprising: (i) a metalized material according to any one of examples 1-46; and (ii) a carrier layer located directly adjacent to the TCL.

Example 48. The peelable metalized material of example 47, wherein the carrier layer comprises an average thickness from about 25 to about 100 microns, such as at least about any of the following: 25, 30, 40 and 50 microns, and/or at most about any of the following: 100, 90, 80, 70, 60, and 50 microns.

Example 49. The peelable metalized material of examples 47-48, wherein the carrier layer comprises a polyester, a polyvinyl chloride, a polypropylene, a polyethylene, a thermoplastic polyurethane, paper, or any combination thereof.

Example 50. The peelable metalized material of examples 47-49, further comprising a first bond strength between the carrier layer and the TCL and a second bond strength between the TCL and the MCL, wherein the second bond strength is larger than the first bond strength.

Example 51. A method of producing a peelable metalized material, comprising: (i) providing or forming a metal-containing intermediate material comprising (a) a carrier layer, (b) a transparent coating layer (TCL) located directly adjacent the carrier layer; (c) a metal coating layer (MCL) located directly adjacent the TCL, and (d) optionally a protective coating directly or indirectly adjacent the MCL, wherein the MCL is located between the protective coating and the TCL; (ii) providing or forming a substrate comprising at least one nonwoven, at least one film, or a combination thereof; and (iii) bonding the metal-containing intermediate material to the substrate to provide the peelable metalized material according to anyone of examples 47-50.

Example 52. The method of example 51, wherein forming the metal-containing intermediate material comprises (a) providing or forming a carrier layer, (b) depositing a transparent coating layer (TCL) directly onto the carrier layer; (c) depositing a metal coating layer (MCL) directly onto the TCL, and (d) optionally depositing a protective coating directly or indirectly onto the MCL.

Example 53. The method of examples 51-52, wherein forming the substrate comprises producing a composite including a first nonwoven layer and a first film layer.

Example 54. The method of example 53, wherein producing the composite comprises melt extruding the first film layer directly onto a first side of the first nonwoven layer.

Example 55. The method of example 53, wherein producing the composite comprises adhesively bonding the first film layer onto a first side of the first nonwoven via a first adhesive layer.

Example 56. The method of examples 51-55, wherein bonding the metal-containing intermediate material to the substrate to provide the peelable metalized material comprises adhesively bonding the metal-containing intermediate material directly to the substrate via a second adhesive layer.

Example 57. The method of example 56, wherein the second adhesive layer is deposited onto the substrate, followed by lamination of the substrate and the metal-containing intermediate material; wherein the second adhesive layer is located between and adjacent the substrate and the MCL or between and adjacent the substrate and the optional protective layer.

Example 58. The method of example 56, wherein the second adhesive layer is deposited onto the metal-containing intermediate material, followed by lamination of the substrate and the metal-containing intermediate material; wherein the second adhesive layer is located between and adjacent the substrate and the MCL or between and adjacent the substrate and the optional protective layer.

Example 59. The method of example 57-58, wherein the second adhesive layer is located between and adjacent the first nonwoven layer and the MCL or between and adjacent the first nonwoven layer and the optional protective layer.

Example 60. The method of examples 51-52, wherein the substrate comprises a first nonwoven layer, and wherein bonding the metal-containing intermediate material to the substrate comprises adhesively bonding the first nonwoven layer directly to the MCL or to the optional protective layer via a second adhesive layer.

Example 61. The method of example 60, further comprising bonding a first film layer to the first nonwoven layer subsequent to the step of bonding the first nonwoven directly to the MCL or to the optional protective layer vie a second adhesive layer.

Example 62. The method of example 61, wherein bonding the first film layer to the first nonwoven layer comprises melt extruding the first film layer directly onto a first side of the first nonwoven layer.

Example 63. The method of example 61, wherein bonding the first film layer to the first nonwoven layer comprises adhesively bonding the first film layer onto a first side of the first nonwoven via a first adhesive layer.

Example 64. A method of producing a metalized material, comprising: (i) providing a peelable metalized material according to any one of examples 47-50 or forming a peelable metalized material according to anyone of examples 51-63; (ii) removing the carrier layer to provide a metalized material according to any one of examples 1-63.

Example 65. The method of example 64, wherein removing the carrier layer comprises a delamination process, wherein the carrier layer is separated from the TCL and the TCL defines a first outermost layer of the metalized material.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

That which is claimed:

1. A peelable metalized material, comprising:

(i) a metalized material comprising (a) a substrate comprising a nonwoven, a film, or a combination thereof; (b) a metal coating layer (MCL); and (c) a transparent coating layer (TCL), wherein the MCL is located directly or indirectly between the substrate and the TCL; and (ii) a carrier layer located directly adjacent to the TCL, wherein (a) the metalized material has (a) a moisture vapor transmission rate (MVTR) of 25-500 g/m2 per 24 hours as determined by ASTM E96D and (b) the TCL defines a first outermost surface of the metalized material and the substrate defines a second outermost surface of the metalized material.

2. The peelable metalized material of claim 1, wherein the carrier layer comprises an average thickness from about 25 to about 100 microns.

3. The peelable metalized material of claim 1, wherein the carrier layer comprises a polyester, a polyvinyl chloride, a polypropylene, a polyethylene, a thermoplastic polyurethane, paper, or any combination thereof.

4. The peelable metalized material of claim 1, further comprising a first bond strength between the carrier layer and the TCL and a second bond strength between the TCL and the MCL, wherein the second bond strength is larger than the first bond strength.

5. The peelable metalized material of claim 1, wherein the substrate comprises a composite including a first nonwoven layer and a first film layer.

6. The peelable metalized material of claim 5, wherein the composite comprises the first film layer melt extruded directly onto the first nonwoven layer.

7. The peelable metalized material of claim 5, wherein the composite further comprises a first adhesive layer located between and bonding the first nonwoven layer and the first film layer; wherein the first adhesive layer has a basis weight from about 0.2 to about 5 gsm.

8. The peelable metalized material of claim 5, wherein the first nonwoven layer comprises one or more spunbond layers, one or more meltblown layers, one or more needlepunched layers, one or more hydroentangled layers, one or more carded layer, one or more sub-micron layers, or any combinations thereof.

9. The peelable metalized material of claim 5, wherein the first film layer comprises a single layer microporous film or a single layer monolithic film.

10. The peelable metalized material of claim 5, wherein the first film layer comprises a multilayer film including one or more microporous films and/or one or more monolithic films.

11. The peelable metalized material of claim 1, further comprising a protective coating located between the MCL and the substrate.

12. The peelable metalized material of claim 11, further comprising a second adhesive layer located between and bonding the protective coating to the substrate.

13. The peelable metalized material of claim 1, wherein the MCL comprises a highly reflective metal or highly reflective metal alloy comprising aluminum or an alloy thereof, gold or an alloy thereof, copper or an alloy thereof, silver or an alloy thereof, or any combination thereof.

14. The peelable metalized material of claim 1, wherein the metalized material has an electrical conductivity of less than about $5.0\times10^{-11}$ S/m.

* * * * *